US 12,248,411 B2

(12) United States Patent
Lee et al.

(10) Patent No.: US 12,248,411 B2
(45) Date of Patent: Mar. 11, 2025

(54) DATA BURST QUEUE MANAGEMENT

(71) Applicant: Micron Technology, Inc., Boise, ID (US)

(72) Inventors: Eric N. Lee, San Jose, CA (US); Luigi Pilolli, L'Aquila (IT); Ali Feiz Zarrin Ghalam, Sunnyvale, CA (US); Xiangyu Tang, San Jose, CA (US); Daniel Jerre Hubbard, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/144,957

(22) Filed: May 9, 2023

(65) Prior Publication Data

US 2023/0367723 A1 Nov. 16, 2023

Related U.S. Application Data

(60) Provisional application No. 63/340,762, filed on May 11, 2022.

(51) Int. Cl.
*G06F 13/16* (2006.01)
*G06F 12/0879* (2016.01)
*G06F 13/32* (2006.01)

(52) U.S. Cl.
CPC ...... *G06F 13/1626* (2013.01); *G06F 12/0879* (2013.01); *G06F 13/32* (2013.01)

(58) Field of Classification Search
CPC ... G06F 13/1626; G06F 12/0879; G06F 13/32
USPC .......................................... 711/158
See application file for complete search history.

(56) References Cited

U.S. PATENT DOCUMENTS 10,534,565 B1 * 1/2020 Banerjee ............. G11C 11/4094
2021/0357155 A1 * 11/2021 You ....................... G06F 3/0634

* cited by examiner

*Primary Examiner* — Hua J Song
(74) *Attorney, Agent, or Firm* — LOWENSTEIN SANDLER LLP

(57) ABSTRACT

Operations include establishing a queue storing a list of data burst commands to be communicated via a multiplexed interface coupled to the set of memory dies, communicating, during a first time period, a first data burst command in the queue to a first memory die of the set of memory dies via the multiplexed interface, and communicating, during a second time period, a second data burst command in the queue to a second memory die of the set of memory dies via the multiplexed interface, where a first latency associated with the first data burst command occurs during the second time period.

20 Claims, 13 Drawing Sheets

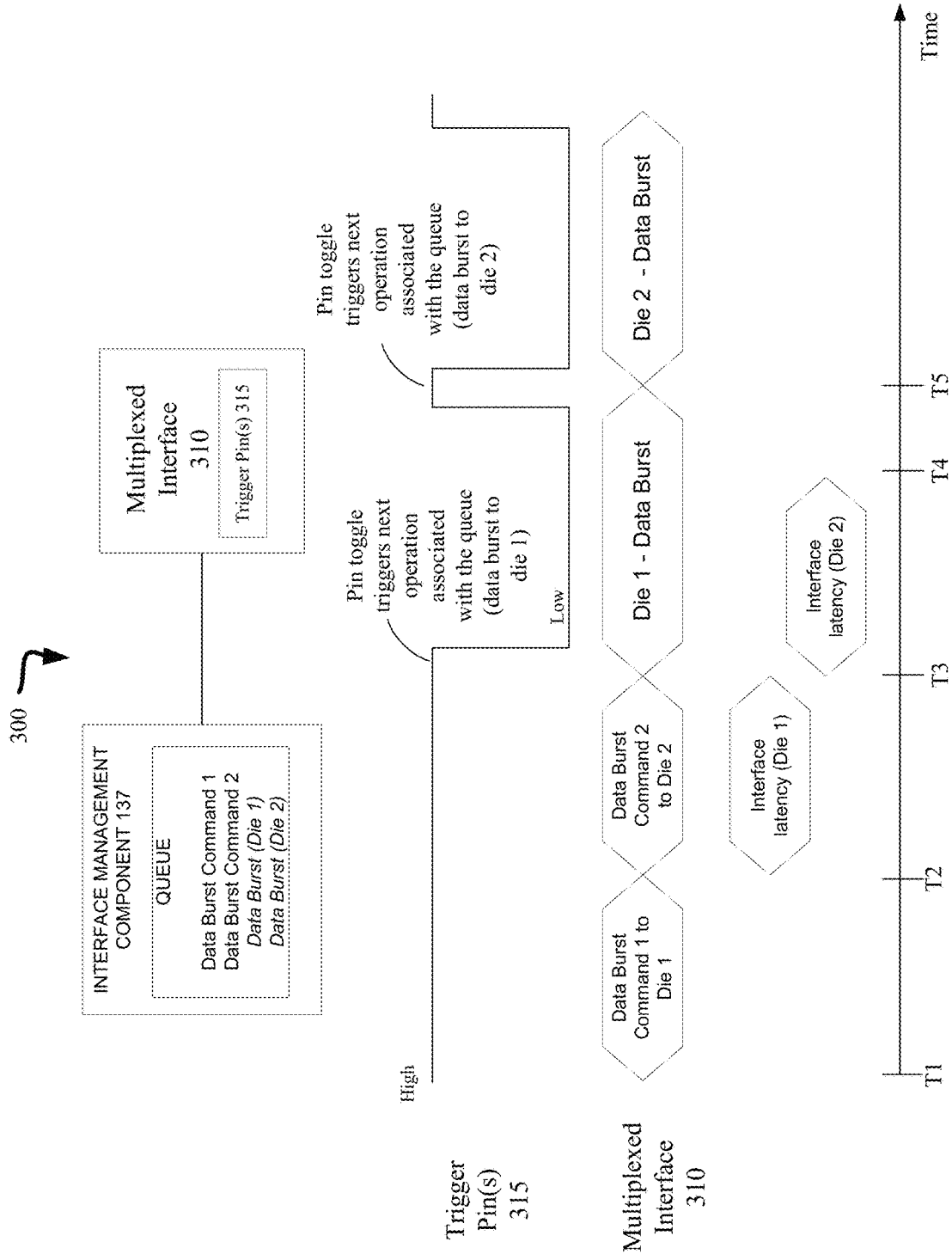

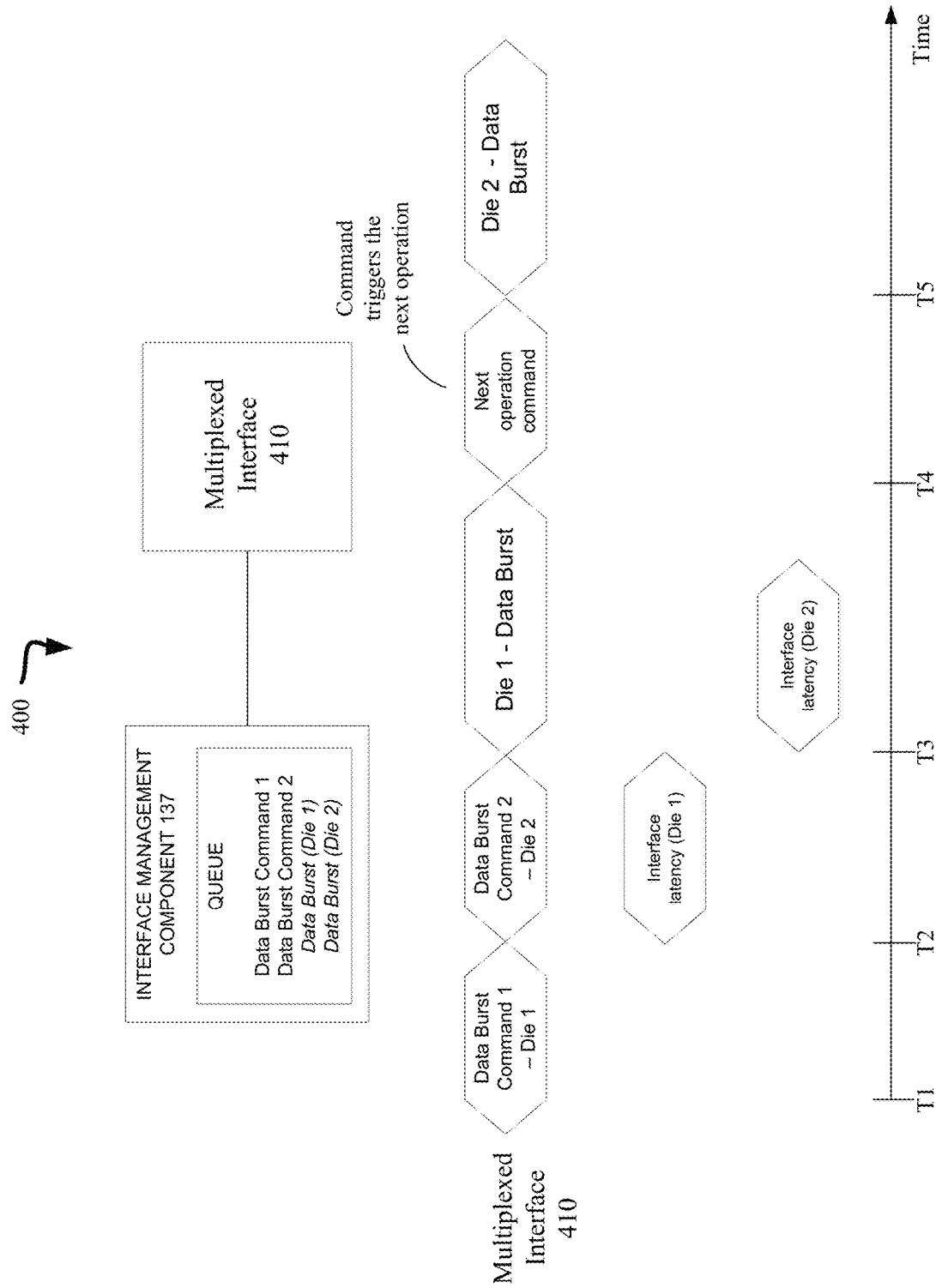

DATA BURST QUEUE MANAGEMENT

CROSS-REFERENCE TO RELATED APPLICATION

This application claims the benefit of U.S. Provisional Application No. 63/340,762, titled "Data Burst Queue Management," filed May 11, 2022, which is hereby incorporated herein by reference in its entirety.

TECHNICAL FIELD

Embodiments of the disclosure relate generally to memory sub-systems, and more specifically, relate to managing a queue of data bursts using pin-triggered or command-triggered execution.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a diagram illustrating an example implementation of data burst queue management performed using a pin of a multiplexed interface to trigger the processing of an operation by the multiplexed interface associated with the memory device(s), in accordance with one or more embodiments of the present disclosure.

FIG. 4 is a diagram illustrating an example implementation of data burst queue management performed using a command initiated by an interface management component to trigger the processing of an operation associated with a queue by a multiplexed interface of the memory device(s), in accordance with some embodiments of the present disclosure.

DETAILED DESCRIPTION

Figure 1A:
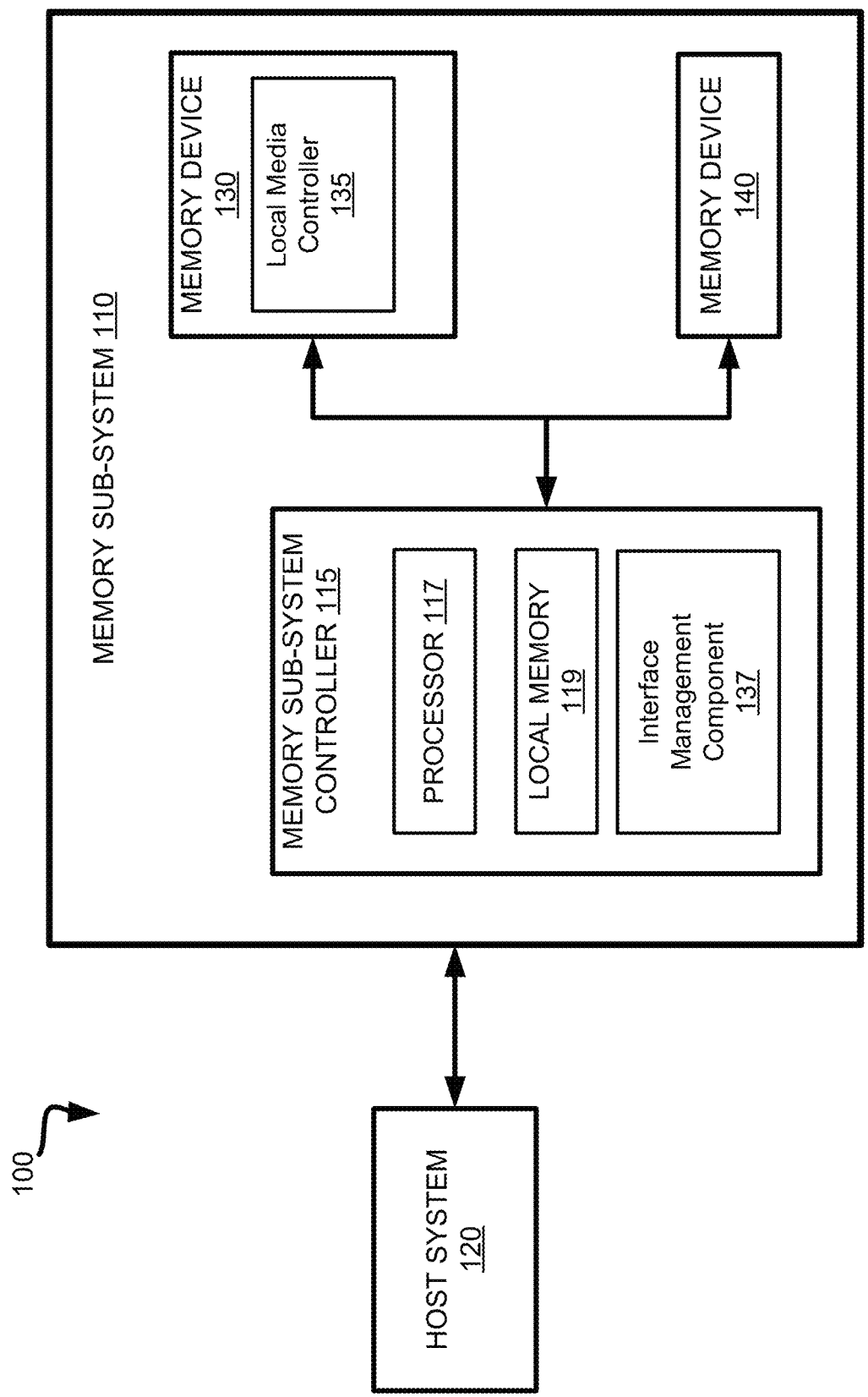
FIG. 1A illustrates an example computing system that includes a memory sub-system, in accordance with one or more embodiments of the present disclosure.

Aspects of the present disclosure are directed to managing a queue of data burst commands and data burst processing via a communication interface. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die can include one or more planes. For some types of non-volatile memory devices (e.g., NAND devices), each plane includes a set of physical blocks. Each block includes a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

The memory sub-system can include an interface between the memory sub-system controller and a memory device (e.g., NAND memory device) to process multiple different signals relating to one or more transfers or communications with the memory device. For example, the interface can process signals relating to memory access commands (e.g., command/address cycles) to configure the memory device to enable the transfer of raw data in connection with a memory access operation (e.g., a read operation, a program operation, etc.). In addition, the interface (e.g., the input/output (I/O) or main data bus) processes the transfer of sets of data (e.g., a data cycle also referred to as a "data burst") between the memory device and the host system in connection with the various memory access commands. For example, the interface handles the communications including raw memory data from the host system to the memory device (e.g., data input bursts and communications including raw memory data from the memory device to the host system (e.g., data output bursts).

The interface can implement a multiplexed interface bus including a number of bidirectional input/output (I/O) pins that can transfer address, data and instruction information between the memory sub-system controller and the memory device (e.g., local media controller and I/O control). The I/O pins can be output pins during read operations, and input pins at other times. For example, the interface bus can be an 8-bit bus (I/O [7:0]) or a 16-bit bus (I/O [15:0]).

The interface can further utilize a set of command pins to implement interface protocols. For example, the set of command pins can include a Chip Enable (CE#) pin, an Address Latch Enable (ALE) pin, a Command Latch Enable (CLE) pin, a Write Enable (WE#) pin, a Read Enable (RE#) pin, a data strobe signal (DQS) pin. Additional pins can include, for example, a write protection (WP#) pin that controls hardware write protection, and a ready/busy (RB#) pin that monitors device status and indicates the completion of a memory access operation (e.g., whether the memory device is ready or busy).

The "#" notation indicates that the CE#, WE#, #RE and WP# pins are active when set to a logical low state (e.g., 0 V), also referred to as "active-low" pins. Therefore, the ALE, CLE and DQS pins are active when set to a logical high state (e.g., greater than 0 V), also referred to as "active-high" pins. Asserting a pin can include setting the logical state of the pin to its active logical state, and de-asserting a pin can include setting the logical state of the pin to its inactive logical state. For example, an active-high pin is asserted when set to a logical high state ("driven high") and de-asserted when set to a logical low state ("driven low"), while an active-low pin is asserted when to set to a logical low state ("driven low") and de-asserted when set to a logical high state ("driven high").

CE#, WE#, RE#, CLE, ALE and WP# signals are control signals that can control read and write operations. For example, the CE# pin is an input pin that gates transfers between the host system and the memory device. For example, when the CE# pin is asserted and the memory device is not in a busy state, the memory device can accept command, data and address information. When the memory device is not performing an operation, the CE# pin can be de-asserted.

The RE# pin is an input pin that gates transfers from the memory device to the host system. For example, data can be transferred at the rising edge of RE#. The WE# pin is an input pin that gates transfers from the host system to the memory device. For example, data can be written to a data register on the rising edge of WE# when CE#, CLE and ALE are low and the memory device is not busy.

The ALE pin and the CLE pin are respective input pins. When the ALE pin is driven high, address information can be transferred from the bus into an address register of the memory device upon a low-to-high transition on the WE# pin. More specifically, addresses can be written to the address register on the rising edge of WE# when CE# and CLE are low, ALE is high, and the memory device is not busy. When address information is not being loaded, the ALE pin can be driven low. When the CLE pin is driven high, information can be transferred from the bus to a command register of the memory device. More specifically, commands can be written to the command register on the rising edge of WE# when CE# and ALE are low, CLE is high, and the memory device is not busy. When command information is not being loaded, the CLE pin can be driven low. Accordingly, a high CLE signal can indicate that a command cycle is occurring, and a high ALE signal can indicate that an address input cycle is occurring.

The data burst transfer includes a continuous set of data input or data output transfer cycles that are performed without pause. A data burst can be initiated by specifying an initial set of parameters including a starting memory address from where to begin the data transfer, and an amount of data to be transferred. After the data burst is initiated, it runs to completion, using as many interface bus transactions as necessary to transfer the amount of data designated by the initial set of parameters. Due at least in part to specifying the set of parameters, the data burst process can generate an overhead penalty with respect to pre-transfer instruction execution. However, since the data burst can continue without any processor involvement after the initiation, processing resources can be freed up for other tasks.

The multiple data bursts associated with respective memory access commands are processed and performed sequentially on the interface. Each sequentially executed data burst is initiated by a data burst command followed by a wait latency associated with the interface (also referred to as "interface latency"). Once the interface latency or wait time is complete, the data burst is processed by a sequence of signaling using pins of the interface. Upon completion of a data burst, another (e.g., a subsequent) memory access command can be processed by the interface, followed by a corresponding interface latency, and the corresponding data burst. Accordingly, successive data bursts follow the strict order of processing including a first stage of command processing, a second stage of interface latency and a third stage of data burst processing.

The sequential processing of the data command, interface latency, and data bursts prevents parallel processing of memory access operation commands and corresponding data burst processing or the interleaving of memory dies. Accordingly, the throughput of the processing of multiple data bursts corresponding to respective memory access operation commands is limited by the ordering of the data burst sequence. Furthermore, the performance and efficiency of a typical memory device interface or input/output (I/O) bus is negatively impacted by the sequential processing of the data burst commands and corresponding interface latency that occupies time on the I/O bus preceding each high speed data burst. As data rates increase in memory devices, this strictly ordered sequence associated with data burst processing results in a reduction in bus performance and efficiency.

Aspects of the present disclosure address the above and other deficiencies by queuing multiple data bursts associated with respective data burst commands. Embodiments described herein can enable the generation and management of a data burst queue including N number (e.g., where N=1, 2, 3, etc.) of data bursts (e.g., input data bursts and output data bursts). In an embodiment, the data burst queue can be formed and managed using a multiplexed interface (e.g., an Open NAND Flash Interface (ONFI)) configured to process commands, address information, and data bursts (also referred to as a "multiplexed interface" or a "multiplexed memory device interface").

In an embodiment, the data burst queue can be formed and managed using an input/output (I/O) or memory device interface having a first portion designated or assigned to processing memory access commands and a second portion designated or assigned to processing data bursts (also referred to as a "multi-portion interface" or "multi-portion memory device interface). In this embodiment, the multi-portion interface includes the first portion having one or more pins that are assigned to process memory device commands (e.g., command/address cycles) associated with one or more memory devices of the memory sub-system. A controller of the memory sub-system identifies a memory device command associated with a memory die of the memory device and processes the memory device command using the first portion of the dual interface (also referred to a "command interface" or "command interface portion"). In an embodiment, the command interface can be used by the controller to transmit status polling communications to the one or more memory devices. The multi-portion interface further includes a second portion having one or more pins assigned to process data burst communications (herein referred to as a "data burst interface" or "data burst interface portion". In response to identifying a data burst communication, the controller causes processing of the data burst communication via the designated data burst interface portion of the multi-portion memory device interface.

In an embodiment, multiple memory access operation commands (e.g., N number of commands) can be processed along with a latency or wait time corresponding to a time to complete the respective memory access operation. The multiple memory access operation commands are communicated between a memory device controller and a memory device using a multiplexed interface or a multi-portion interface to enable the execution of the memory access operations on the memory device. Advantageously, management of the data burst command queue enables greater efficiency in the usage of the high speed I/O data bus by "hiding" memory device latencies and command overhead while enabling quick successive data bursts. Advantages of the present disclosure include, but are not limited to, improved memory device performance (e.g., I/O performance) and resource efficiency (e.g., I/O bus efficiency).

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such media or memory devices. The memory sub-system 110 can be a storage device, a memory module, or a hybrid of a storage device and memory module.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The memory device(s) 130 can be non-volatile memory device(s). One example of non-volatile memory devices is a not-and (NAND) memory device. A non-volatile memory device is a package of one or more dice or logic units (LUNs). Thus, each memory device 130 can be a die (or LUN) or can be a multi-dice package that includes multiple dice (or LUNs) on a chip, e.g., an integrated circuit package of memory dies. Each memory die can include one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., the one or more memory devices 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory device(s) 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory device(s) 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device(s) 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory device(s) 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device(s) 130 (e.g., perform media management operations on the memory device(s) 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system controller 115 can implement an interface management component 137 that can manage a queue of data burst commands and corresponding data bursts to enable the processing of data bursts via an input/output (I/O) interface between the memory sub-system controller 115 and one or more memory device(s) 130 (e.g., one or more memory dies). For example, the interface management component 137 can establish the queue and maintain an ordered list of multiple data bursts associated with respective data burst commands to be processed using a communication interface (e.g., a multiplexed interface or a multi-portion interface). The interface management component 137 generates and manages the data burst queue including N number (e.g., where N=1, 2, 3, etc.) of data bursts (e.g., input data bursts and output data bursts). In an embodiment, the data burst queue can be used to identify which operation (e.g., a data burst command or data burst) to process via the interface. In an embodiment, multiple memory access operation commands (e.g., N number of commands) can be processed along with a latency or wait time corresponding to a time to complete the respective memory access operation. The multiple memory access operation commands are communicated between a memory device controller and a set of memory dies using a multiplexed interface or a multi-portion interface to enable the execution of the memory access operations on the memory device. Advantageously, management of the data burst command queue enables latencies periods associated with the memory dies to be hidden or performed concurrently with operations processing by the communication interface (e.g., the processing of a data burst command or a data burst), resulting in improved memory device performance (e.g., I/O performance) and resource efficiency (e.g., I/O bus efficiency). Further details regarding implementing commands and data bursts using a queue are described below with reference to FIGS. 3-10.

Figure 1B:
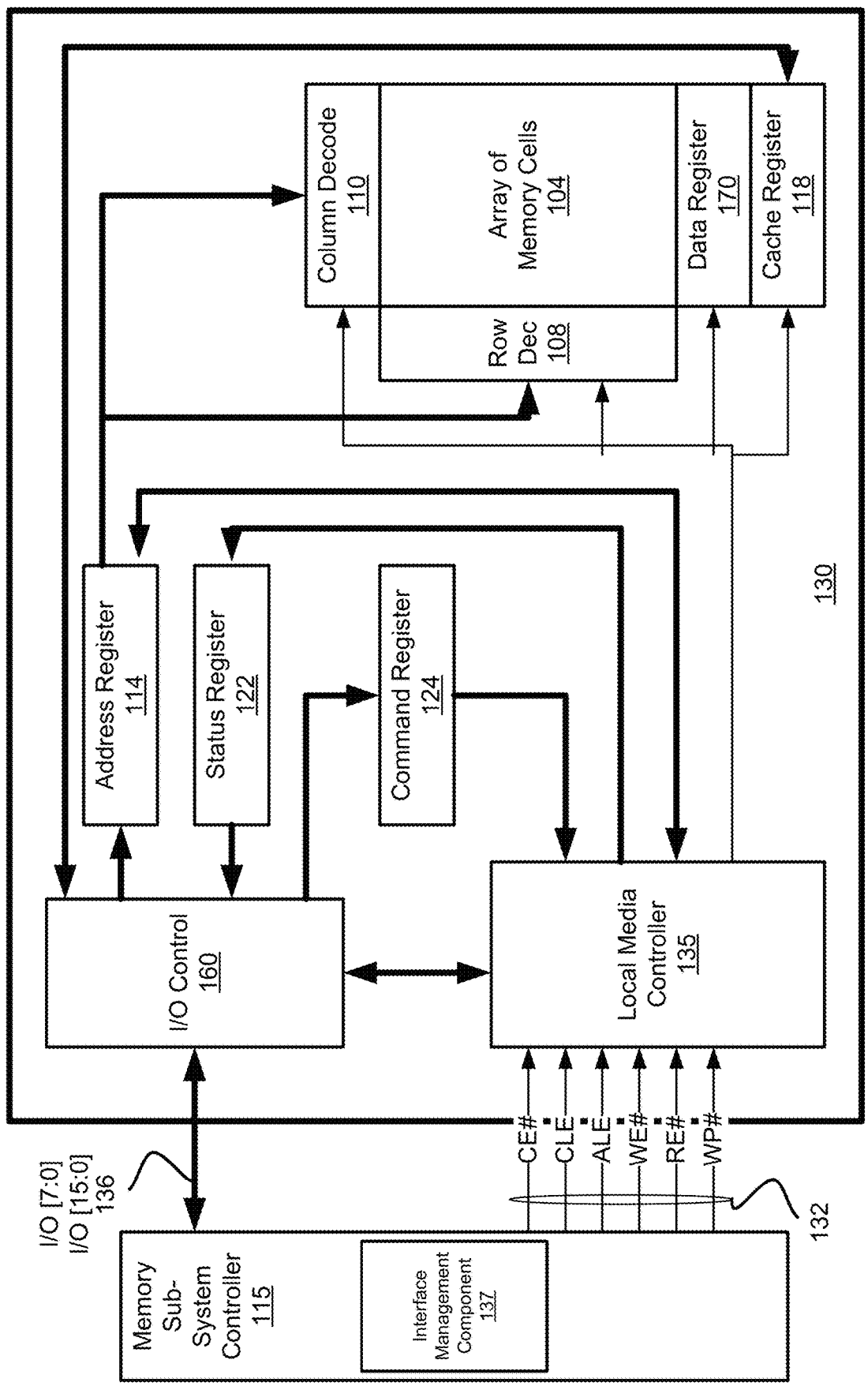
FIG. 1B is a block diagram of memory device(s) in communication with a memory sub-system controller of a memory sub-system according to an embodiment.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device(s) 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device(s) 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes portions configured to communicate with the interface management component 137 of the memory sub-system controller 115, which can implement the defect detection described herein during an erase operation on memory device(s) 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device(s) 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
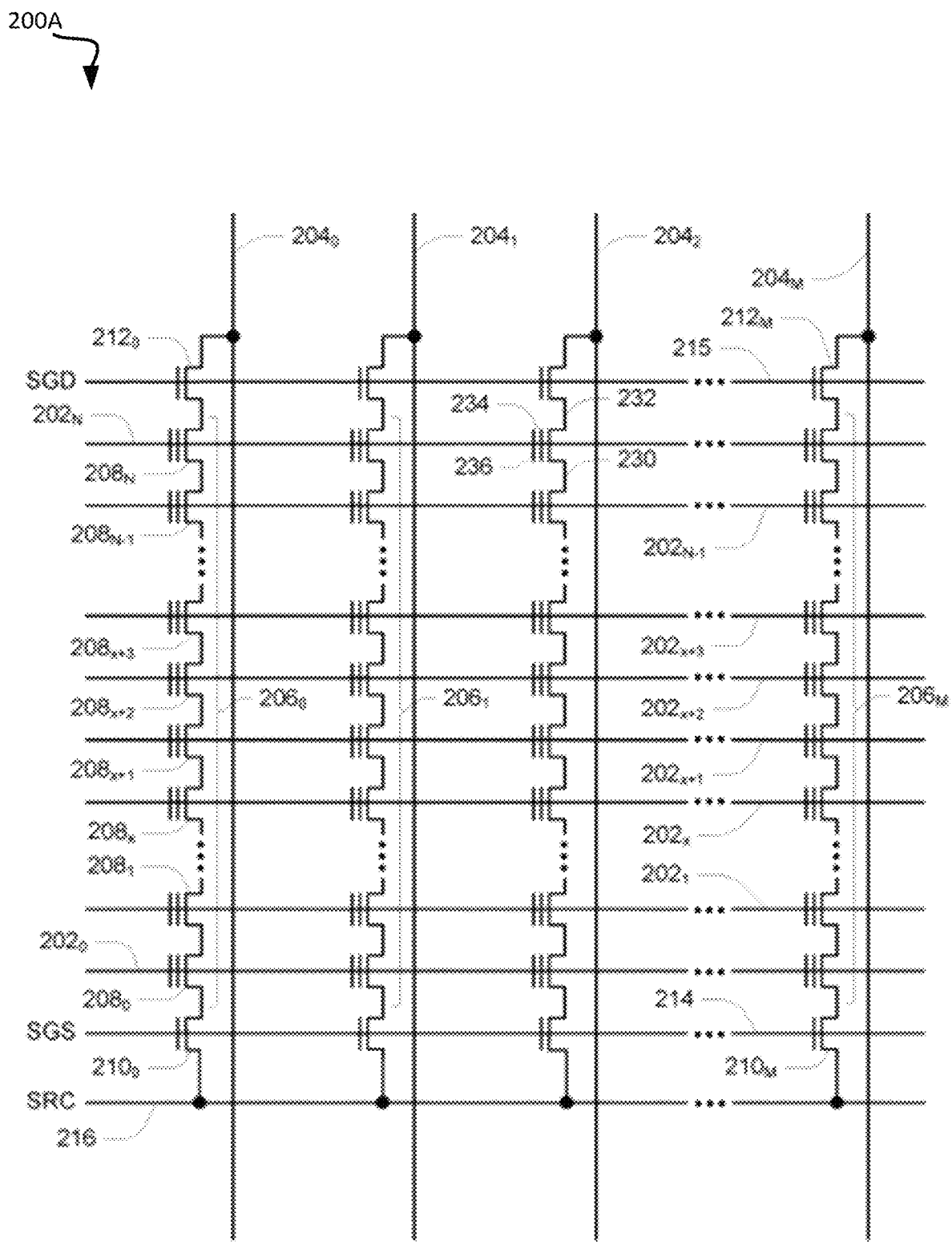
FIGS. 2A-2C are diagrams of portions of an example array of memory cells included in a memory device, in accordance with some embodiments of the present disclosure.
Figure 2B:
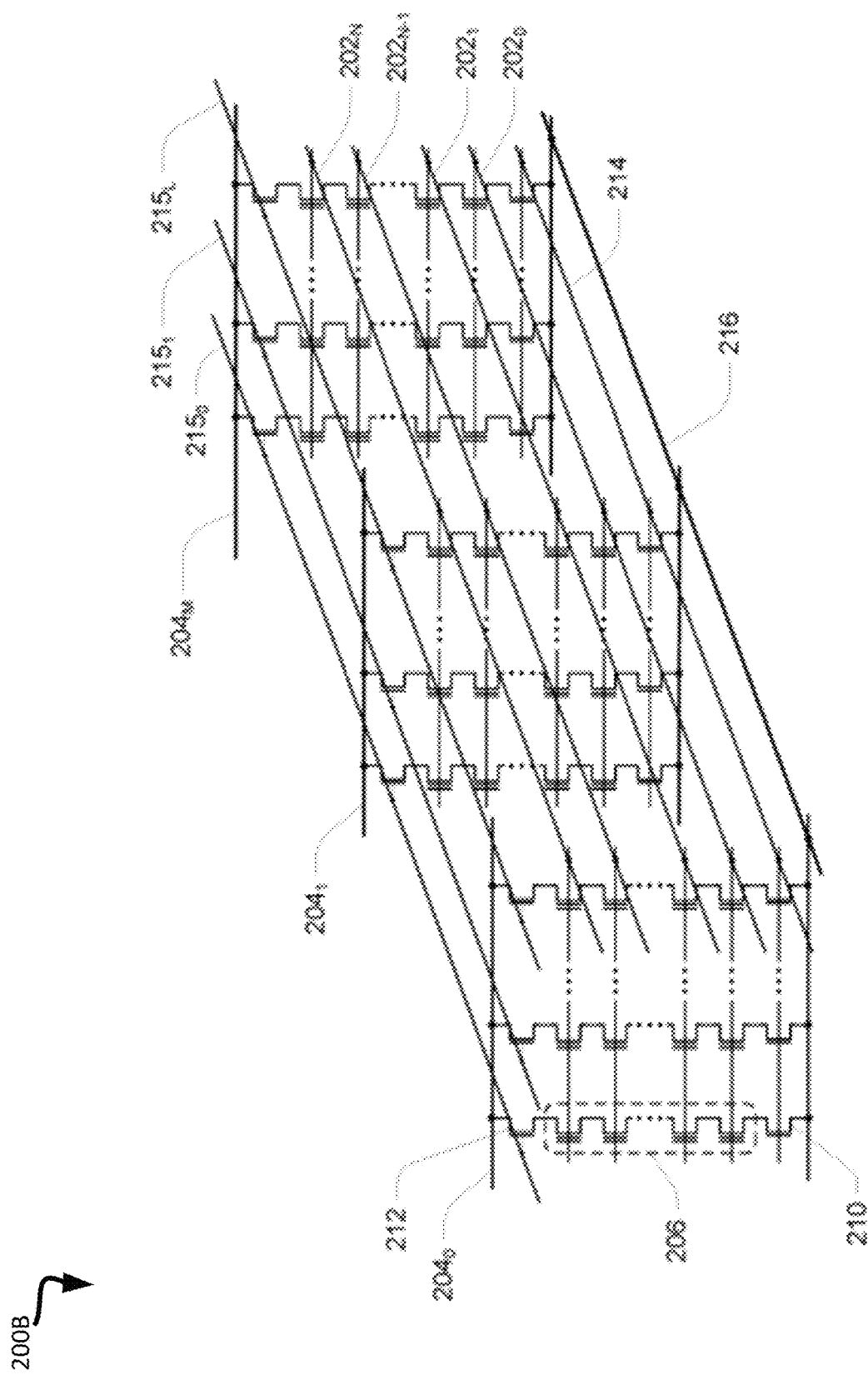
Figure 2C:
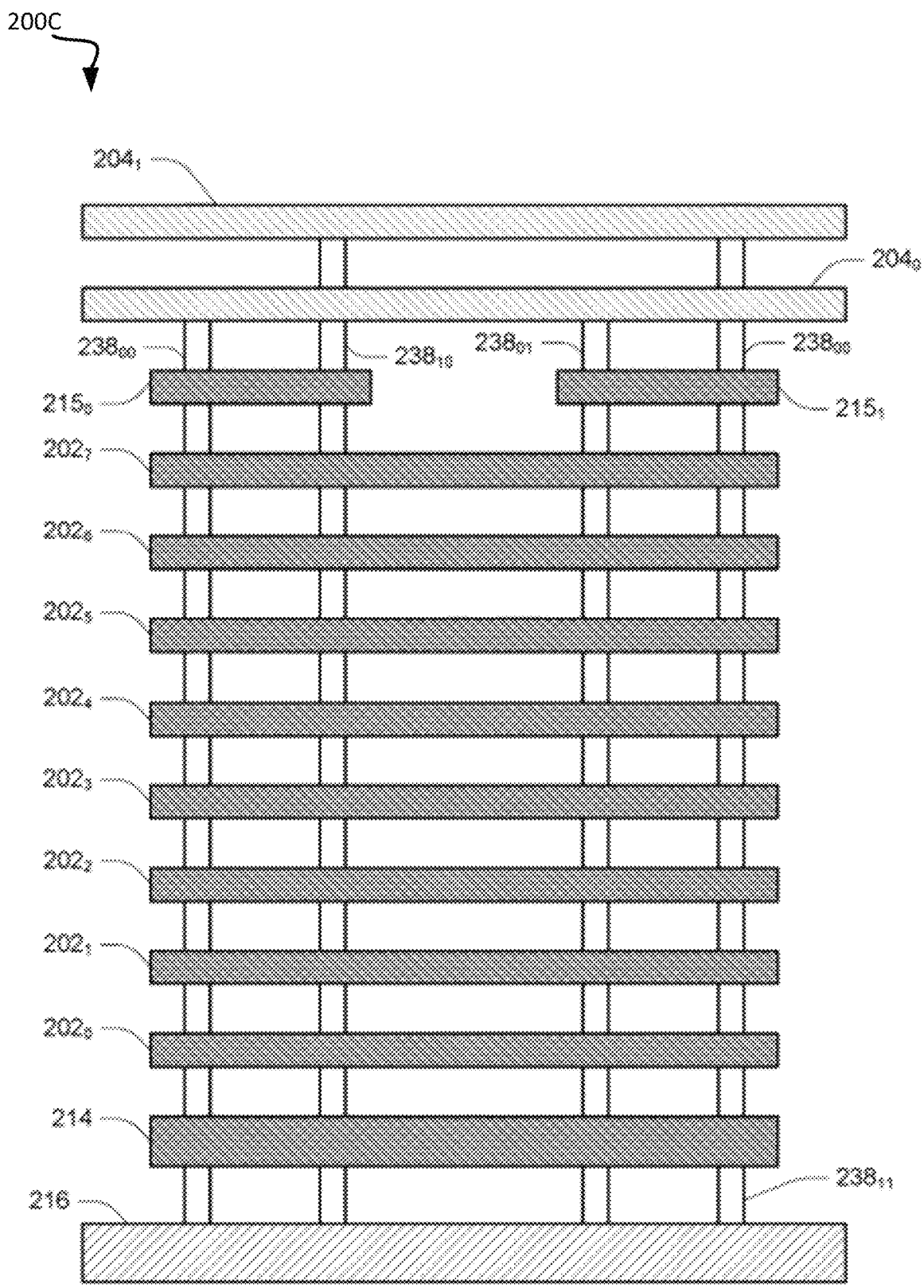

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

FIG. 3 is a diagram 300 illustrating an example implementation of data burst queue management performed using one or more pins of a multiplexed interface 310 to trigger the processing of another operation by the multiplexed interface 310, in accordance with one or more embodiments of the present disclosure. The interface management component 137 establishes a queue of memory access operation commands (also referred to as "data burst commands") corresponding to memory access operations (e.g., a read operation, a write operation, etc.) relating to one or more memory dies. In an embodiment, the interface management component 137 is a portion of the memory sub-sub-system controller (e.g., memory sub-system controller 115 of FIGS. 1A and 1B. In the example shown in FIG. 3, the queue includes a first data burst command (data burst command 1) corresponding to a first memory access operation targeted for memory die 1 and a second data burst command (data burst command 2) corresponding to a second memory access operation targeted for memory die 2. Accordingly, as shown in FIG. 3, multiple data burst commands (data burst command 1 and data burst command 2) associated with multiple memory dies (memory die 1 and memory die 2) are queued with respect to the multiplexed interface 310. In this example, data burst command 1 is queued for communication to memory die 1 and data burst command 2 is queued for communication to memory die 2. In an embodiment, the processing of each respective data burst command initiates a sequence of operations corresponding to the command including the processing of a corresponding data burst using the multiplexed interface 310. For example, as shown in FIG. 3, execution of data burst command 1 is followed by a subsequent data burst to memory die 1 and execution of data burst command 2 is followed by a subsequent data burst to memory die 2.

As shown in FIG. 3, one or more pins 315 of the multiplexed interface 310 (herein referred to as "trigger pin(s)" 315) is used to determine when the multiplexed interface 310 can execute another event or operation (e.g., a data burst command or a data burst associated with a previously executed command). In an embodiment, the trigger pin(s) 315 can include a single trigger pin or a series of trigger pins configured to operate in conjunction with one another. In an embodiment, when the trigger pin(s) 315 (e.g., a CE# pin) is set to a first logical level (e.g., a high value or "1"), it indicates that the multiplexed interface is ready to perform another operation associated with the queue (e.g., a next command stored in the queue or a next data burst associated with an ongoing data burst sequence initiated by a previously processed command). In response to the transitioning of the trigger pin 315 from the first logical level (e.g., the high value or "1") to a second logical level (e.g., a low value or "0"), a data burst associated with the queue is performed (i.e., the data burst is communicated). During processing of a current operation (e.g., the data burst) by the multiplexed interface 310, the trigger pin(s) 315 is set to a second logical level (e.g., a low value or "0") which indicates that the multiplexed interface 310 is busy and not ready for a next operation.

As shown in FIG. 3, at a first time T1, the interface management component 137 uses the queue to identify data burst command 1 as a next operation to process via the multiplexed interface 310. Following completion of the processing of data burst command 1, at time T2, the interface management component 137 refers to the queue to identify a next command in the queue to be processed. In the example shown, using the queue, data burst command 2 is identified as a next operation for processing by the multiplexed interface 310. Advantageously, as shown in FIG. 3, the interface latency associated with memory die 1 corresponding to data burst command 1 is "hidden" or takes place during or concurrently with the execution of data burst command 2 by the multiplexed interface 310.

In this example, upon completion of the processing of data burst command 2 associated with memory die 2, at time T3, the trigger pin(s) 315 is transitioned from the first logical level to the second logical level to indicate that the multiplexed interface is ready to process or communicate a data burst to a memory device. In an embodiment, the trigger pin(s) are toggled from the first logical level to the second logical level (e.g., the low value state) to trigger or cause the interface management component 137 to communicate the data burst to memory die 1. Advantageously, as shown in FIG. 3, the interface latency associated with the processing by memory die 2 in preparation for the data burst corresponding to data burst command 2 occurs concurrently with the processing of the data burst to memory die 1 by the multiplexed interface 310 (i.e., both the data burst to memory die 1 and the interface latency associated with memory die 2 occur in parallel during a time period between T3 and T4).

Upon completion of the processing of data burst command 1 by the multiplexed interface 137, the one or more trigger pins 315 are transitioned from the second logical level to the first logical level. As shown in FIG. 3, at time T5, the second toggle of the trigger pin(s) occurs, causing the interface management component 137 to communicate the data burst to memory die 2 via the multiplexed interface 137.

As illustrated in the example shown in FIG. 3, while an ongoing or current operation is being processed by the multiplexed interface 310 relating to the respective memory dies (e.g., memory die 1 and memory die 2), the interface latency (i.e., the time corresponding to the processing performed by the memory die to prepare for a corresponding data burst) can be "hidden" or performed in parallel with another activity on the multiplexed interface 310. For example, as shown in FIG. 3, the interface latency associated with the processing of data burst command 1 by memory die 1 (referred to as "interface latency 1" in FIG. 3) is concurrent with the processing of data burst command 2 by the multiplexed interface 310. Also as shown in FIG. 3, the interface latency associated with the processing of data burst command 2 by memory die 2 (referred to as "interface latency 2" in FIG. 3) occurs while the data burst associated with memory die 1 (i.e., the data burst corresponding to data burst command 1) is being processed by the multiplexed interface 310. Accordingly, queueing of the data burst commands enables execution of the command and one or more operations required to prepare for the corresponding data burst to be performed in parallel with processing of further operations by the multiplexed interface 310, thereby resulting in improved performance and efficiency of the multiplexed interface 310.

In an embodiment, as new commands are issued and received by the interface management component, those commands can be added to the queue and handled by the multiplexer interface 310 in accordance with the pin-triggered process described above. For example, one or more subsequent commands (e.g., a data burst command for memory die 3, a data burst command for memory die 4, etc.) can be added to the queue as the multiplexer interface 310 is processing the commands and data bursts previously stored in the queue.

FIG. 4 is a diagram 400 illustrating an example implementation of data burst queue management performed using a command initiated by an interface management component 137 to trigger a "next" or subsequent operation associated with a queue for processing by a multiplexed interface 410, in accordance with some embodiments of the present disclosure. For example, the "next" command can include the allowing of a current or on-going data burst to complete, followed by the beginning of another or next operation. In an embodiment, the command can be a single command to end one data burst and being another data burst. In an embodiment, the command can include a multi-command sequence includes a first command to end one data burst and a second command to begin another data burst. The various embodiments can be referred to as the processing of a "next" command.

Like the example described in connection with FIG. 3, the interface management component 137 establishes and manages a queue of data burst commands corresponding to memory access operations (e.g., a read operation, a write operation, etc.) relating to one or more memory dies. In the example shown in FIG. 4, the queue includes a first data burst command (data burst command 1) corresponding to a first memory access operation targeted for memory die 1 and a second data burst command (data burst command 2) corresponding to a second memory access operation targeted for memory die 2.

In this embodiment, the two queued data burst commands are processed in sequence (i.e., in the order within the queue) by the multiplexed interface 410. In this example, at time T1, the interface management component 137 initiates the processing of data burst command 1 to memory die 1 via the multiplexed interface 410. Upon completion of the processing of data burst command 1, at time T2, the next operation in the queue (e.g., data burst command 2) is initiated by the interface management component 137 for processing to memory die 2 via the multiplexed interface 410. As shown in FIG. 4, both the processing of data burst command 2 and the interface latency associated with memory die 1 corresponding to data burst command 1 occur in parallel (i.e., in a time period between T2 and T3).

In an embodiment, upon completion of the processing of data burst command 2, at time T3, the interface management component 137 uses the queue to determine the next operation to process via the multiplexed interface 410. In this example, the next operation is the data burst associated with the memory die 1. As shown in FIG. 4, the processing of the data burst associated with memory die 1 (e.g., an input data burst to memory die 1 or an output data burst from memory die 1) by the multiplexed interface 410 is performed in parallel or concurrently with the interface latency associated with the burst command 2 (interface latency (die 2)).

In an embodiment, a time T4, the interface management component 137 determines that the data burst associated with memory die 1 is completed and, in response, initiates a next operation command via the multiplexed interface 410. In an embodiment, the next operation command is communicated to one or more of the memory dies and serves as a trigger for the execution of a next operation. In this example, the next operation to be performed is the data burst associated with memory die 2. Accordingly, in view of the next operation command, at time T5, the data burst associated with memory die 2 that resulted from data burst command 2 is processed via the multiplexed interface 410.

Advantageously, as shown in FIG. 4, the interface latencies (e.g., the interface latency associated with memory die 1 and the interface latency associated with memory die 2) occur concurrently with the processing of other operations (e.g., data burst command 2 and the data burst associated with memory die 1, respectively) by the multiplexed interface 410.

Figure 5:
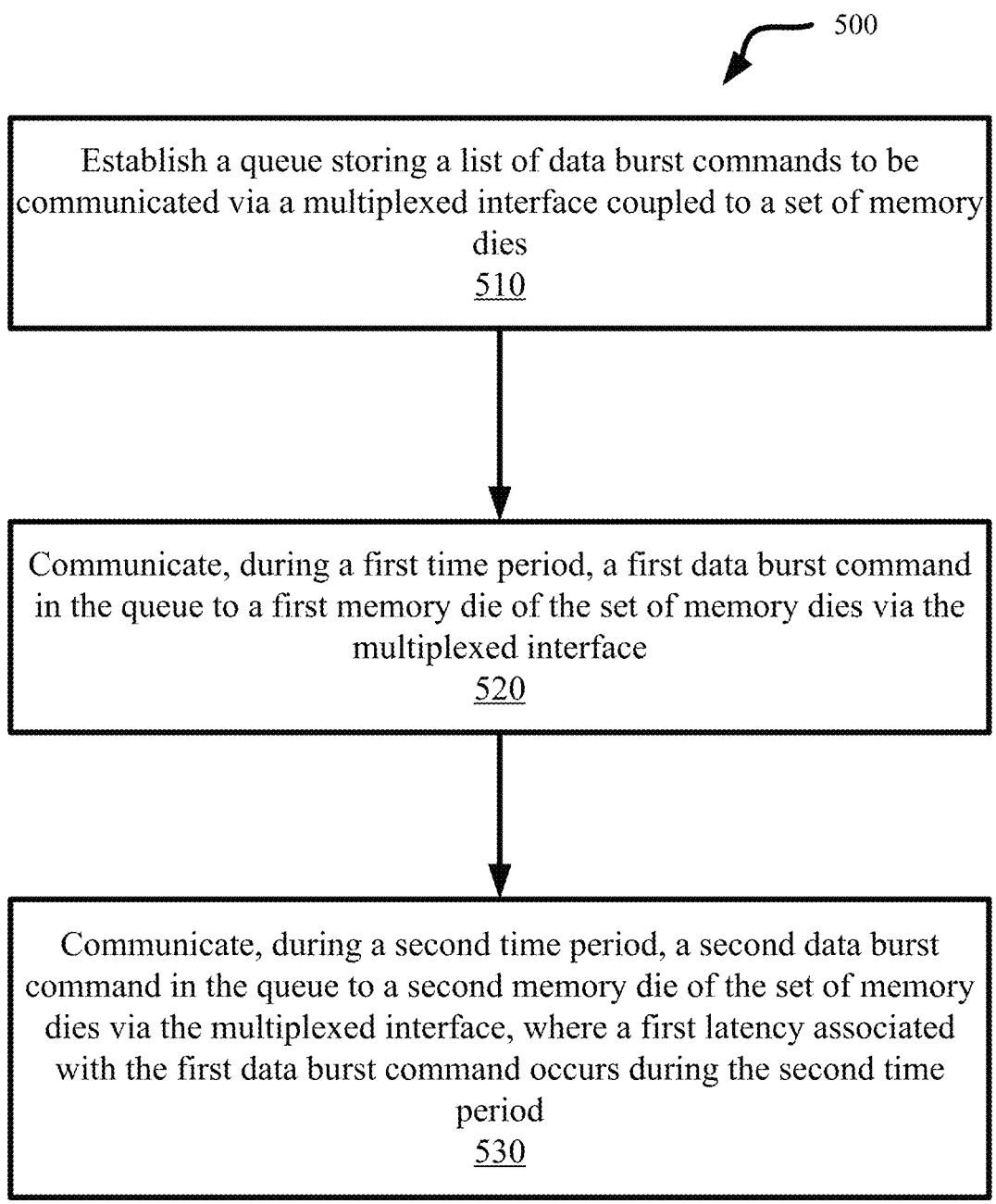
FIG. 5 illustrates a flow diagram of an example method to manage communications with a set of memory dies via a multiplexed interface in accordance with a queue of data burst commands, in accordance with some embodiments of the present disclosure.

FIG. 5 illustrates a flow diagram of an example method 500 to manage communications with a set of memory dies via a multiplexed interface in accordance with a queue of data burst commands, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the interface management component 137 of FIGS. 1A-1B, 3, and 4.

At operation 510, a queue of commands is established. For example, processing logic (e.g., interface management component 137) can establish a queue storing a list of data burst commands (e.g., memory access operation commands that are associated with a corresponding data burst) to be communicated via a multiplexer interface (e.g., multiplexer interface 310 of FIG. 3 or multiplexer interface 410 of FIG. 4) coupled to a set of memory dies (e.g., a first memory die, a second memory die . . . an Nth memory die). In an embodiment, the queue includes an ordered list of pending data burst commands to be processed via the multiplexed interface. In an embodiment, the processing logic can generate and manage a data structure including the queue with the ordered list of data burst commands to be transmitted to a respective target memory die of the set of memory dies.

At operation 520, a command is communicated. For example, processing logic can communicate, during a first time period, a first data burst command in the queue to a first memory die of the set of memory dies via the multiplexed interface. In an embodiment, the communication of the first data burst command can be triggered by the detection of a triggering value (e.g., a first logical level) corresponding to a trigger pin of the multiplexed interface, as described in detail above with respect to FIG. 3. In an embodiment, the processing logic identifies the first data burst command as a 'next' command listed in the queue. In an embodiment, during the first time period, the multiplexed interface is used to communicate the first data burst command to the first memory die.

At operation 530, a command is communicated. For example, the processing logic communicates, during a second time period, a second data burst command in the queue to a second memory die of the set of memory dies via the multiplexed interface, where a first latency associated with the first data burst command occurs during the second time period. In an embodiment, the first latency associated with the operations and activities performed in connection with preparing the first memory die for the data burst corresponding to the first data burst command occurs concurrently with the processing of the second data burst command by the multiplexed interface. Accordingly, improved performance and efficiency of the multiplexed interface is realized by using the queue to identify and process the next data burst command (e.g., the second data burst command) concurrently with the interface latency associated with the previous data burst command (e.g., the first data burst command), as shown in FIG. 3 and FIG. 4.

According to embodiment, the process 500 can proceed with the processing logic using the queue to identify a next operation (e.g., a next queued data burst command or a data burst associated with the previously processed data burst command). In an embodiment, the processing logic can be triggered to identify and process the next operation in response to the toggling of trigger pin of the multiplexed interface, as described above with respect to FIG. 3. In another embodiment, as described above with reference to FIG. 4, the processing logic can identify a next operation associated with a queued data command to be processed by the multiplexed interface in response to a next operation command communicated to one or more of the set of memory dies.

Figure 6:
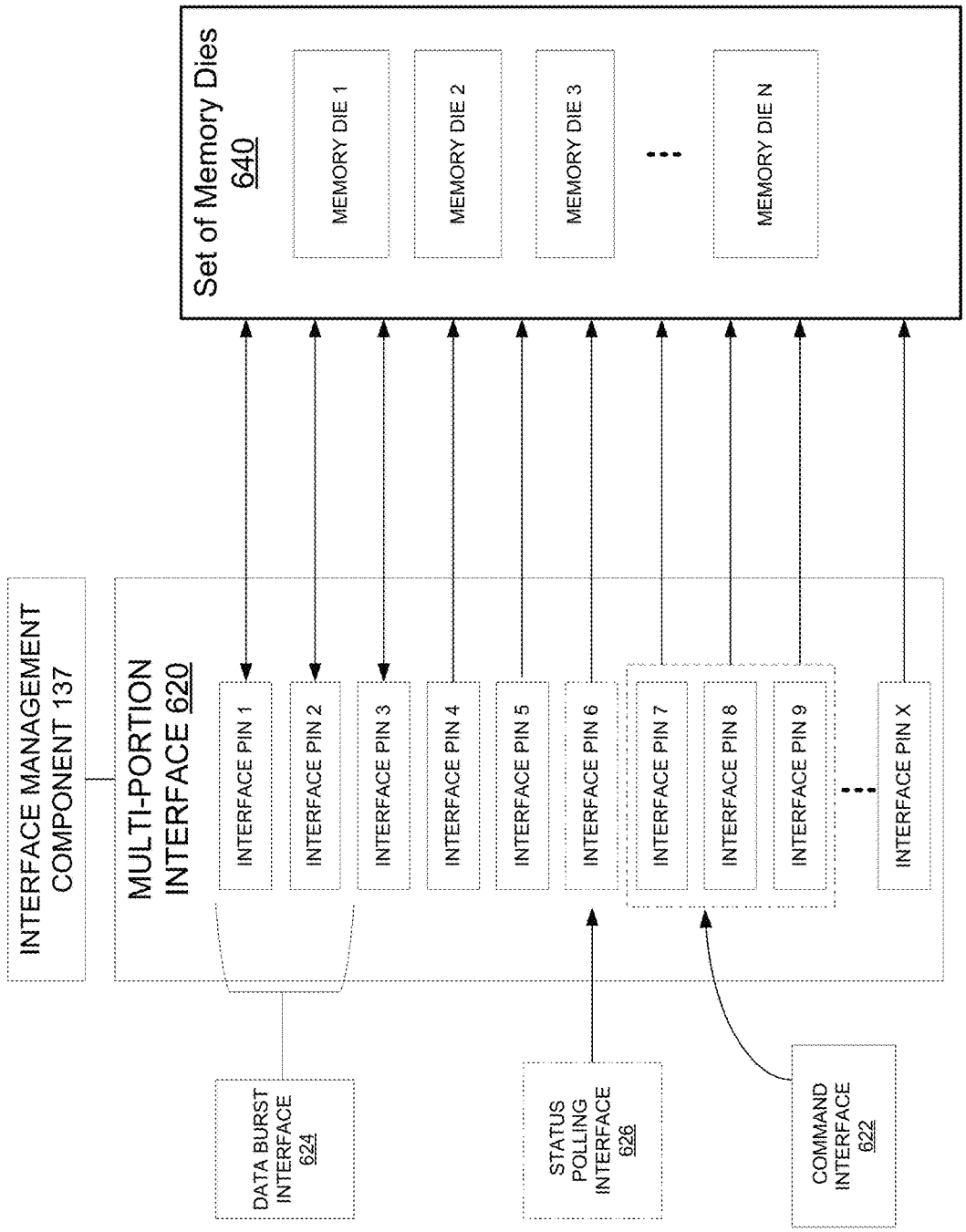
FIG. 6 illustrates an example controller including a multi-portion memory device interface with a command interface portion and a data burst interface portion, in accordance with one or more embodiments of the present disclosure.

FIG. 6 illustrates an example interface management component 137 coupled to a multi-portion memory device interface 620 coupled to a set of memory dies 640 (e.g., memory die 1, memory die 2, memory die 3 . . . memory die N), according to embodiments. The multi-portion memory device interface 620 includes a set of interface pins (e.g., interface pin 1, interface pin 2 . . . interface pin X). In an embodiment, the multi-portion memory device interface 620 includes a command interface 622 including a first portion of the interface pins (e.g., interface pin 7, interface pin 8, and interface pin 9) assigned or dedicated to processing commands from the controller to the set of memory dies 640. In an embodiment, the command interface 622 is an independent portion of the multi-portion memory device interface 620 which is used by the controller to transmit memory device commands (e.g., command/address cycles) associated with one or more memory dies of the set of memory dies 640. In an example, the command interface 622 can include an Address Latch Enable (ALE) pin, a Command Latch Enable (CLE) pin, and a Write Enable (WE#) pin) for dedicated use for processing the memory device commands. Although not shown in FIG. 6, it is noted that multiple memory devices can be connected to the multi-portion memory device interface 620.

As shown in FIG. 6, the multi-portion memory device interface 620 also includes a data burst interface 624 including a second portion of the interface pins (e.g., interface pin 1 and interface pin 2) assigned or dedicated to processing data bursts between a host system and the multi-portion memory device 640. In an embodiment, a portion of the multi-portion memory device interface 620 associated with a main I/O or data bus (e.g., DQ and DQS interface pins) can be used to transmit and receive data bursts associated with the set of memory dies 640. Advantageously, as illustrated in FIG. 6, the use of the independent command interface 622 for servicing the command communications enables the concurrent transmission of commands (via the command interface 622) and the data bursts (via the data burst interface 624).

In an embodiment, the command interface 622 can further be used to transmit status polling communications to the set of memory dies 640. This enables the concurrent processing of status polling communications and data burst communications. In an embodiment, a separate portion of the multi-portion memory device interface 620 can be assigned or designated for servicing status polling communications. In this embodiment, a status polling interface 626 can be established using one or more existing interface pins or by adding an additional interface pins.

Figure 7:
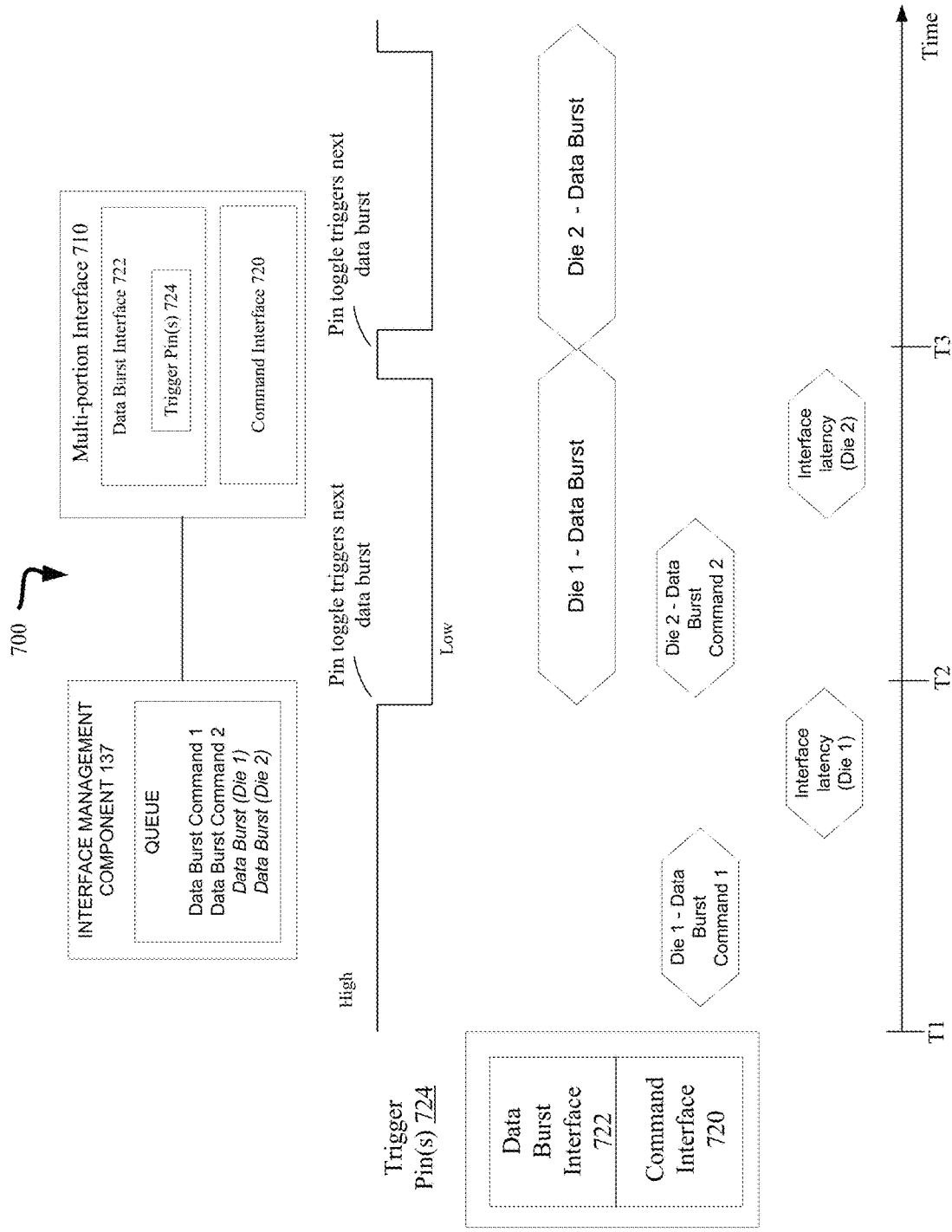
FIG. 7 is a diagram illustrating an example implementation of data burst queue management performed using a pin of a multi-portion interface having a first portion or set of pins associated with processing commands and a second portion or set of pins associated with processing data bursts, in accordance with one or more embodiments of the present disclosure.

FIG. 7 is a diagram 700 illustrating an example implementation of data burst queue management performed using a pin of an interface 710 (also referred to as multi-portion interface 710) having a first portion or set of pins associated with processing commands (i.e., a command interface, such as command interface 620 of FIG. 6) and a second portion or set of pins associated with processing data bursts (i.e., a data burst interface, such as data burst interface 622 of FIG. 6). The multi-portion interface 710 uses the pin (also referred to as "trigger pin 724") to trigger the processing of a next operation by the multi-portion interface 710, in accordance with one or more embodiments of the present disclosure. The interface management component 137 establishes a queue of data burst commands corresponding to memory access operations (e.g., a read operation, a write operation, etc.) relating to a set of memory dies (e.g., the set of memory dies 640 of FIG. 6). In the example shown in FIG. 7, the queue includes a first data burst command (data burst command 1) corresponding to a first memory access operation targeted for memory die 1 and a second data burst command (data burst command 2) corresponding to a second memory access operation targeted for memory die 2. Accordingly, as shown in FIG. 7, multiple data burst commands (data burst command 1 and data burst command 2) associated with multiple memory dies (memory die 1 and memory die 2) are queued with respect to the multi-portion interface 710. In this example, data burst command 1 is queued for communication to memory die 1 and data burst command 2 is queued for communication to memory die 2. In an embodiment, the processing of each respective data burst command initiates a sequence of operations corresponding to the command including the processing of a corresponding data burst using the multi-portion interface 710.

The interface management component 137 maintains and uses the queue to identify an order of processing of data burst commands to process via the command interface 720. In the example shown in FIG. 7, the interface management component 137 uses the queue and initiates the processing of data burst command 1 via the command interface 720 at time T1. At time T2, the interface management component 137 uses the queue to initiate the processing of data burst command 2 via the command interface 720 at time T2.

As illustrated in FIG. 7, the command interface 720 is used to process the ordered list of commands stored in the queue (e.g., data burst command 1 and data burst command 2) that are to be communicated to respective target memory dies (e.g., memory die 1 and memory die 2) of the set of memory dies. In an embodiment, the timing of the processing that data bursts associated with the data burst commands is managed by the interface management component 137 using a trigger pin 724 of the data burst interface 722. As shown in FIG. 7, the trigger pin 724 (e.g., the DQ_CE# pin) is part of the set of pins of the data burst interface 720 is used to trigger the processing of a next data burst via the data burst interface 720 of the multi-portion interface 710. In an embodiment, the interface management component 137 detects a signal or value corresponding to the trigger pin 724 to determine when a next data burst can be processed via the data burst interface 722. For example, as shown in FIG. 7, during a time period between T1 and T2, the trigger pin 724 is at a first logical level (e.g., has a value of "1") indicating that the data burst interface 722 is ready to process a data burst.

In the example shown, in response to the trigger pin 724 toggling from a first logical level to a second logical level, the data burst targeted to memory die 1 (corresponding to data burst command 1) is triggered and communicated via the data burst interface 722. Upon completion of the processing of the data burst to memory die 1, at time T3, the trigger pin 724 transitions from the second logical level to the first logical level. In an embodiment, the trigger pin 724 is toggled from the first logical level to the second logical level to trigger the communication of the data burst corresponding to data burst command 2. Advantageously, as shown in FIG. 7, the processing of data burst command 2 via the command interface 720, the interface latency associated with data burst command 2, and the data burst corresponding to data burst command occur concurrently during a time period between time T2 and T3.

Figure 8:
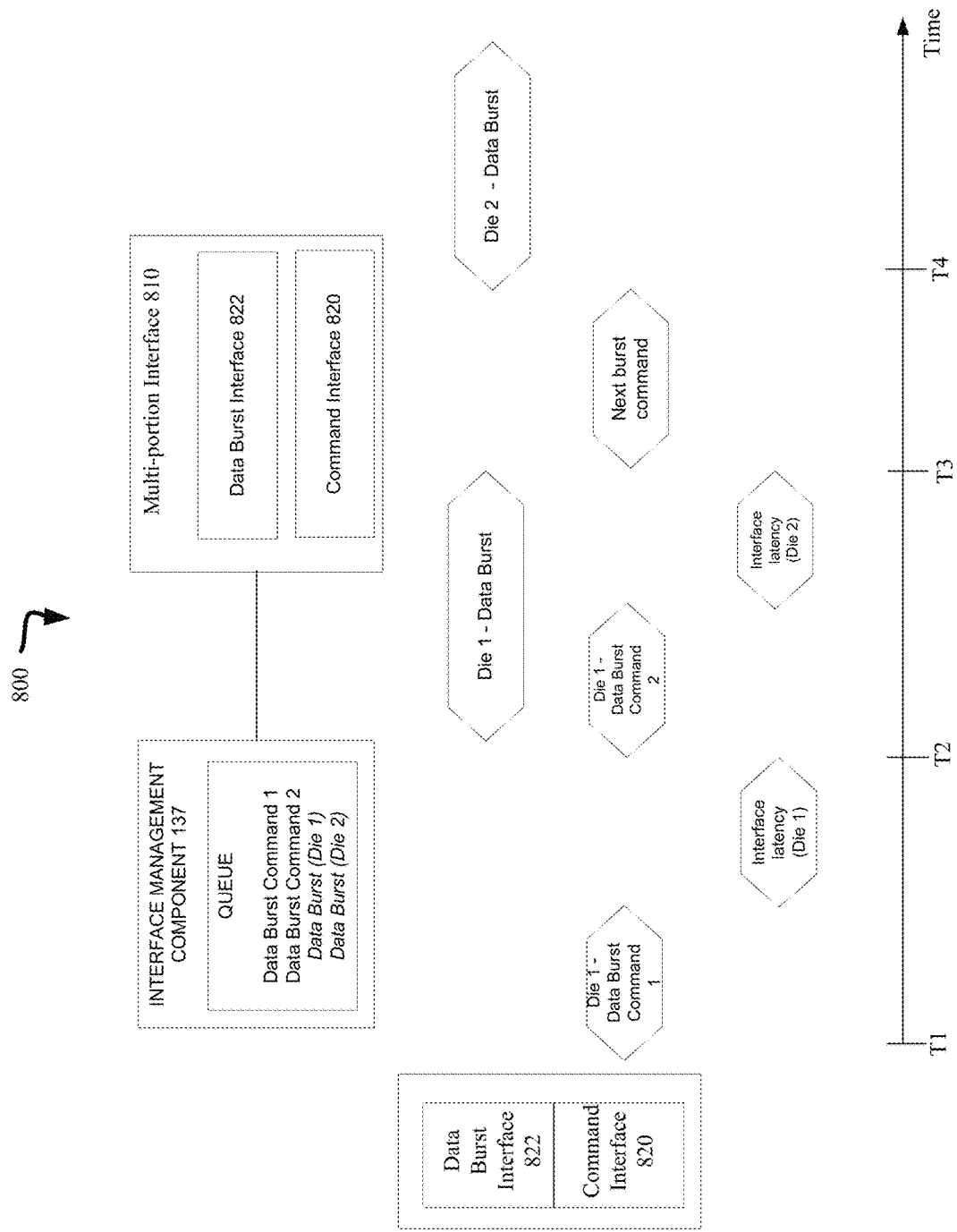
FIG. 8 is a diagram illustrating an example implementation of data burst queue management performed using a command initiated by an interface management component to trigger an operation associated with a queue for processing by a multi-portion interface, in accordance with some embodiments of the present disclosure.

FIG. 8 is a diagram 800 illustrating an example implementation of data burst queue management performed using a command initiated by an interface management component 137 to trigger a "next" or subsequent operation associated with a queue for processing by a multi-portion interface 810, in accordance with some embodiments of the present disclosure. Like the example described in connection with FIG. 4, the interface management component 137 establishes and manages a queue of data burst commands corresponding to memory access operations (e.g., a read operation, a write operation, etc.) relating to one or more memory dies. The multi-portion interface 810 includes a first portion or set of pins designated for processing data burst commands (command interface 820) and a second portion or set of pins designated for processing data bursts (data burst interface 822).

In the example shown in FIG. 8, the queue managed by the interface management component 137 includes a first data burst command (data burst command 1) corresponding to a first memory access operation targeted for memory die 1 and a second data burst command (data burst command 2) corresponding to a second memory access operation targeted for memory die 2. In this embodiment, the two queued data burst commands are processed in sequence (i.e., in the order within the queue) using the multi-portion interface 810. In this example, at time T1, the interface management component 137 initiates the processing of data burst command 1 to memory die 1 via the command interface 820 of the multi-portion interface 810. Upon completion of the processing of data burst command 1, at time T2, the next operation in the queue (e.g., data burst command 2) is initiated by the interface management component 137 for processing to memory die 2 via the command interface 820 of the multi-portion interface 810.

As shown in FIG. 8, at time T2, concurrently with the processing of data burst command 2, the data burst associated with data burst command 1 is processing via the data burst interface 822 of the multi-portion interface 820. Advantageously, during a time period between time T2 and T3, the processing of data burst command 2 using the command interface 820, the processing of the data burst associated with data burst command 1 using the data burst interface 822 and the interface latency associated with data burst command 2 take place concurrently.

At time T3, a next burst command is processed via the command interface 820. The next burst command indicates that a prior data burst is complete (e.g., the data burst associated with memory die 1) and the data burst interface 822 is ready to process a next or subsequent data burst (e.g., the data burst associated with memory die 2). In response to the next burst command, at time T4, the data burst associated with memory die 2 is processed via the data burst interface 822. The processing of commands and data bursts using the queue continues until no further commands awaiting processing are stored in the queue.

Figure 9:
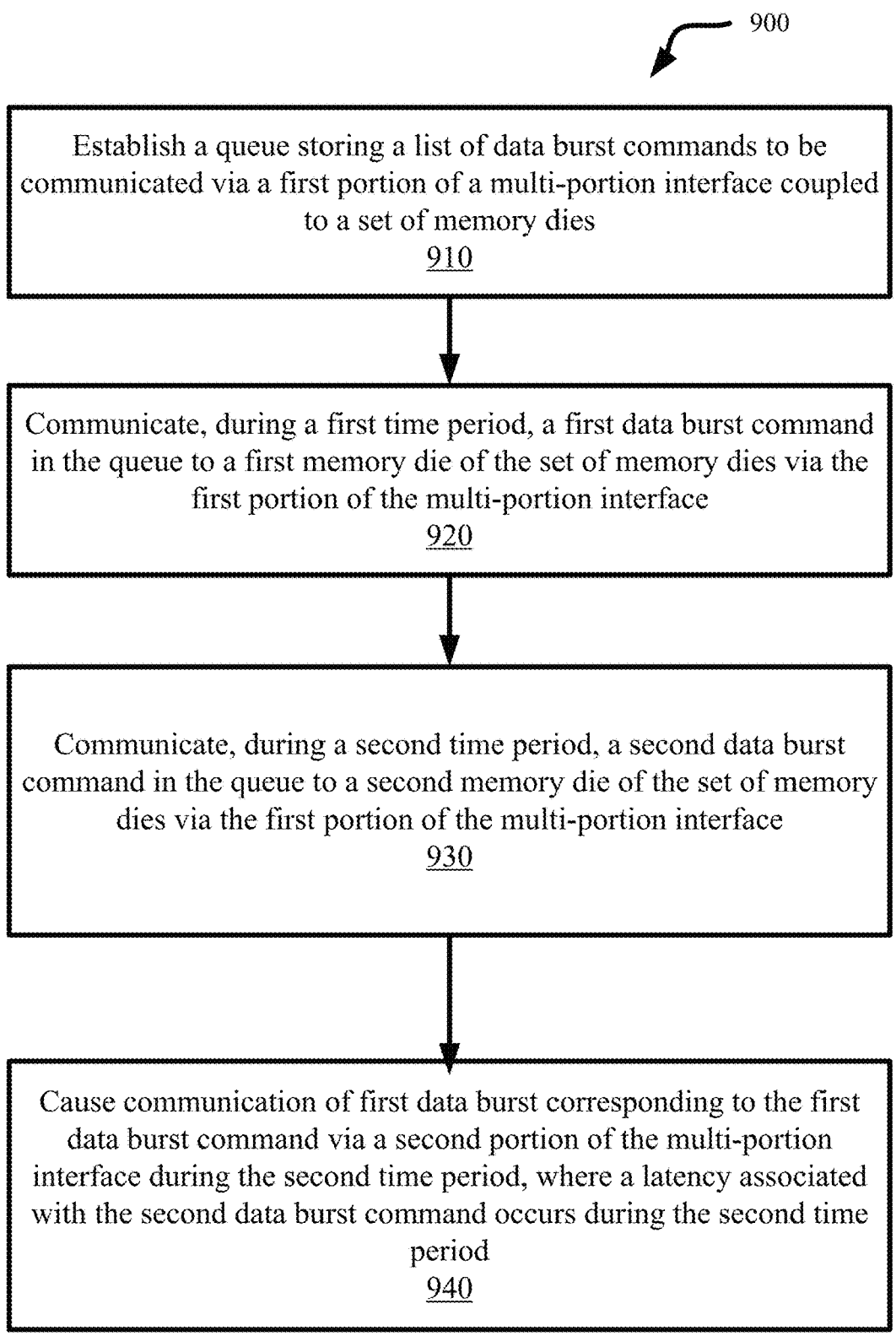
FIG. 9 illustrates a flow diagram of an example method to manage communications with a set of memory dies via a multi-portion interface based on a queue of data burst commands, in accordance with some embodiments of the present disclosure.

FIG. 9 illustrates a flow diagram of an example method 900 to manage communications with a set of memory dies via a multi-portion interface (e.g., multi-portion interface 710, 810 shown in FIGS. 7 and 8, respectively) in accordance with a queue of data burst commands, in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the interface management component 137 of FIGS. 1A-1B, 7, and 8.

At operation 910, a queue of commands is established. For example, processing logic (e.g., interface management component 137) can establish a queue storing a list of data burst commands (e.g., memory access operation commands that are associated with a corresponding data burst) to be communicated via a first portion (e.g., command interface 720, 829 of FIGS. 7 and 8, respectively) of a multi-portion interface (e.g., multi-portion interface 710 of FIG. 7 or multi-portion interface 810 of FIG. 8) coupled to a set of memory dies (e.g., a first memory die, a second memory die . . . an Nth memory die). In an embodiment, the queue includes an ordered list of pending data burst commands to be processed via the multiplexed interface. In an embodiment, the processing logic can generate and manage a data structure including the queue with the ordered list of data burst commands to be transmitted to a respective target memory die of the set of memory dies.

At operation 920, a command is communicated. For example, processing logic can communicate, during a first time period, a first data burst command in the queue to a first memory die of the set of memory dies via the first portion (the command interface 720, 820) of the multi-portion interface.

At operation 930, a command is communicated. For example, the processing logic communicates, during a second time period, a second data burst command in the queue to a second memory die of the set of memory dies via the first portion (command interface 720, 820) of the multi-portion interface. In an embodiment, a first latency associated with the first data burst command can occur concurrently with the other activities on one or more of the first portion (command interface 720, 820) of the multi-portion interface and the second portion (data burst interface 722, 822) of the multi-portion of the multi-portion interface.

At operation 940, a data burst is communicated. For example, the processing logic causes communication of first data burst corresponding to the first data burst command via a second portion (data burst interface 722, 822 of FIGS. 7 and 8, respectively) of the multi-portion interface during the second time period, where a latency associated with the second data burst command occurs during the second time period. As shown in FIGS. 7 and 8, multiple activities can occur in parallel by using the managed queue of commands and the multi-portion interface with a dedicated command interface and data burst interface. For example, the processing of the second data burst command via the command interface, the latency associated with the second data burst command, and the processing of the first data burst via the data burst interface can occur concurrently during the second time period.

Figure 10:
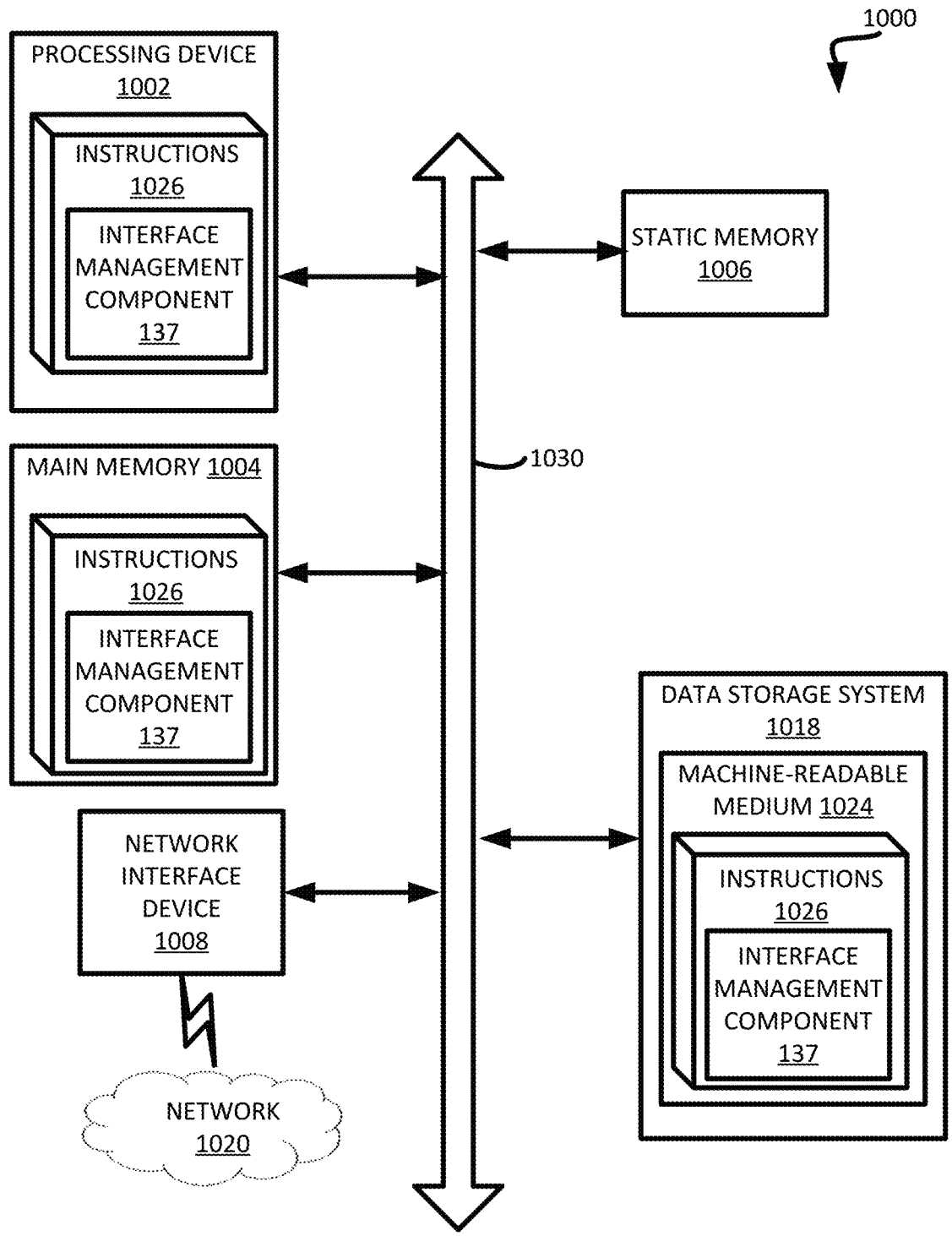
FIG. 10 is a block diagram of an example computer system in which embodiments of the present disclosure may operate.

FIG. 10 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the Interface management component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 408 to communicate over the network 1020.

The data storage system 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 404 can correspond to the memory sub-system 110 of FIG. 1A.

In one embodiment, the instructions 1026 include instructions to implement functionality corresponding to an interface management component (e.g., the interface management component 137 of FIGS. 1A, 1B, 3, 4, 6, 7, and 8). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a set of memory dies; and
a processing device, operatively coupled with the set of memory dies, to perform operations comprising:
establishing a queue storing a list of data burst commands to be communicated via a multiplexed interface coupled to the set of memory dies;
communicating, during a first time period, a first data burst command in the queue to a first memory die of the set of memory dies via the multiplexed interface; and
communicating, during a second time period, a second data burst command in the queue to a second memory die of the set of memory dies via the multiplexed interface, wherein a first latency associated with execution of the first data burst command occurs during the communicating of the second data burst command during the second time period.

2. The system of claim 1, further comprising determining the second data burst command follows the first data burst command in the queue.

3. The system of claim 1, the operations further comprising transitioning a pin from a first logical level to a second logical level following completion of the second data burst command.

4. The system of claim 3, the operations further comprising:
in response to the transitioning of the pin from the first logical level to the second logical level, causing a communication of a first data burst corresponding to the first data burst command via the multiplexed interface.

5. The system of claim 4, wherein a second latency associated with the second data burst command occurs during the communication of the first data burst.

6. The system of claim 4, the operations further comprising:
in response to completion of the communication of the first data burst command, using the queue to identify the second data burst command to be processed via the multiplexed interface;
performing a subsequent transition of the pin from the first logical level to the second logical level following completion of the second data burst command; and
in response to the subsequent transition of the pin from the first logical level to the second logical level, communicating a second data burst corresponding to the second data burst command via the multiplexed interface.

7. The system of claim 1, the operations further comprising:
causing a communication of a first data burst corresponding to the first data burst command via the multiplexed interface;
in response to completion of the communication of the first data burst, communicating a next operation command via the multiplexed interface; and
in response to the next operation command, causing a second communication of a second data burst corresponding to the second data burst command via the multiplexed interface.

8. A system comprising:
a set of memory dies; and
a processing device, operatively coupled with the set of memory dies, to perform operations comprising:
establishing a queue storing a list of data burst commands to be communicated via a first portion of a multi-portion interface coupled to the set of memory dies;
communicating, during a first time period, a first data burst command in the queue to a first memory die of the set of memory dies via the first portion of the multi-portion interface;
communicating, during a second time period, a second data burst command in the queue to a second memory die of the set of memory dies via the first portion of the multi-portion interface; and
causing a communication of first data burst corresponding to the first data burst command via a second portion of the multi-portion interface during the second time period, wherein a latency associated with communicating of the second data burst command occurs during the communication of the first data burst during the second time period.

9. The system of claim 8, wherein the second portion of the multi-portion interface comprises a pin that transitions from a first logical level to a second logical level.

10. The system of claim 9, wherein the first data burst is communicated via the second portion of the multi-portion interface in response to detecting a first transition of the pin from the first logical level to the second logical level.

11. The system of claim 10, wherein a second data burst is communicated via the second portion of the multi-portion interface in response to detecting a second transition of the pin from the first logical level to the second logical level.

12. The system of claim 8, the operations further comprising:
in response to completion of the communication of the first data burst, communicating a next operation command via the first portion of the multi-portion interface; and
in response to the next operation command, causing communication of a second data burst corresponding to the second data burst command via the second portion of the multi-portion interface.

13. The system of claim 8, the operations further comprising:
in response to completion of the communicating of the first data burst command, using the queue to identify the second data burst command to be processed via the multi-portion interface.

14. A method comprising:
establishing a queue storing a list of data burst commands to be communicated via a multiplexed interface coupled to a set of memory dies;
communicating, during a first time period, a first data burst command in the queue to a first memory die of the set of memory dies via the multiplexed interface; and
communicating, during a second time period, a second data burst command in the queue to a second memory die of the set of memory dies via the multiplexed interface, wherein a first latency associated with execution of the first data burst command occurs during the communicating of the second data burst command during the second time period.

15. The method of claim 14, further comprising determining the second data burst command follows the first data burst command in the queue.

16. The method of claim 14, further comprising transitioning a pin from a first logical level to a second logical level following completion of the second data burst command.

17. The method of claim 16, further comprising in response to the transitioning of the pin from the first logical level to the second logical level, causing a communication of a first data burst corresponding to the first data burst command via the multiplexed interface.

18. The method of claim 17, wherein a second latency associated with the second data burst command occurs during the communication of the first data burst.

19. The method of claim 17, further comprising:
in response to completion of the communication of the first data burst, causing a second communication of a second data burst corresponding to the second data burst command via the multiplexed interface.

20. The method of claim 17, further comprising:
in response to completion of the communication of the first data burst command, using the queue to identify the second data burst command to be processed via the multiplexed interface;
performing a subsequent transition of the pin from the first logical level to the second logical level following completion of the second data burst command; and
in response to the subsequent transition of the pin from the first logical level to the second logical level, communicating a second data burst corresponding to the second data burst command via the multiplexed interface.

* * * * *